United States Patent
Lapp, Jr. et al.

[19]

[11] Patent Number: 6,082,019

[45] Date of Patent: Jul. 4, 2000

[54] CONSTRUCTION AID FOR DETERMINING LENGTH AND ANGLE OF STAIR RAILINGS

[75] Inventors: John K. Lapp, Jr.; Reuben B. Lapp, both of New Holland; Lloyd J. Glick, Bird-In-Hand, all of Pa.

[73] Assignee: Quallity Fencing & Supply Co., New Holland, Pa.

[21] Appl. No.: 09/112,386

[22] Filed: Jul. 9, 1998

[51] Int. Cl.[7] .............................. G01B 3/08; G01B 3/10
[52] U.S. Cl. .......................... 33/760; 33/1 N; 33/761; 33/809
[58] Field of Search .......................... 33/282, 413, 759, 33/760, 526, 613, 645, 809, 761, 768–770, 1 N, 534, 424–426, 471, 473

[56] References Cited

U.S. PATENT DOCUMENTS

| | | | |
|---|---|---|---|
| 2,846,770 | 8/1958 | Williams . | |
| 3,568,322 | 3/1971 | Showers . | |
| 3,802,112 | 4/1974 | Banner | 43/21.2 |
| 4,200,984 | 5/1980 | Fink | 33/427 |
| 4,202,108 | 5/1980 | Adams, Jr. et al. . | |
| 4,228,588 | 10/1980 | Horton, Jr. | 33/413 |
| 4,443,954 | 4/1984 | Clark | 33/413 |
| 4,476,635 | 10/1984 | Hart | 33/761 |
| 4,483,073 | 11/1984 | Johnston | 33/1 N |
| 4,989,341 | 2/1991 | Scotese | 33/761 |
| 5,148,605 | 9/1992 | Julia . | |
| 5,309,645 | 5/1994 | Hoffmeyer . | |
| 5,388,337 | 2/1995 | Powers, II . | |
| 5,414,942 | 5/1995 | Moore et al. . | |
| 5,481,810 | 1/1996 | Hastings et al. | 33/768 |
| 5,894,675 | 4/1999 | Cericola | 33/760 |

*Primary Examiner*—Christopher W. Fulton
*Assistant Examiner*—Quyen Doan
*Attorney, Agent, or Firm*—William B. Noll

[57] ABSTRACT

A system for determining the length and angle of stair railings, which system is disclosed in the form of a kit of parts and a method. The system includes a pair of vertically adjustable, simulated post housings to be temporarily positioned at the top and bottom of the stairs, where a first housing includes a pivotally mounted, extendable tape measure and angle scale. When the respective post housings are vertically adjusted to position a slidable base member at the projected height for the railing, the tape measure is then extended to the other post housing. While extended, the railing length and angle ends may be readily determined, and the information therefrom in preparing the railing.

6 Claims, 5 Drawing Sheets

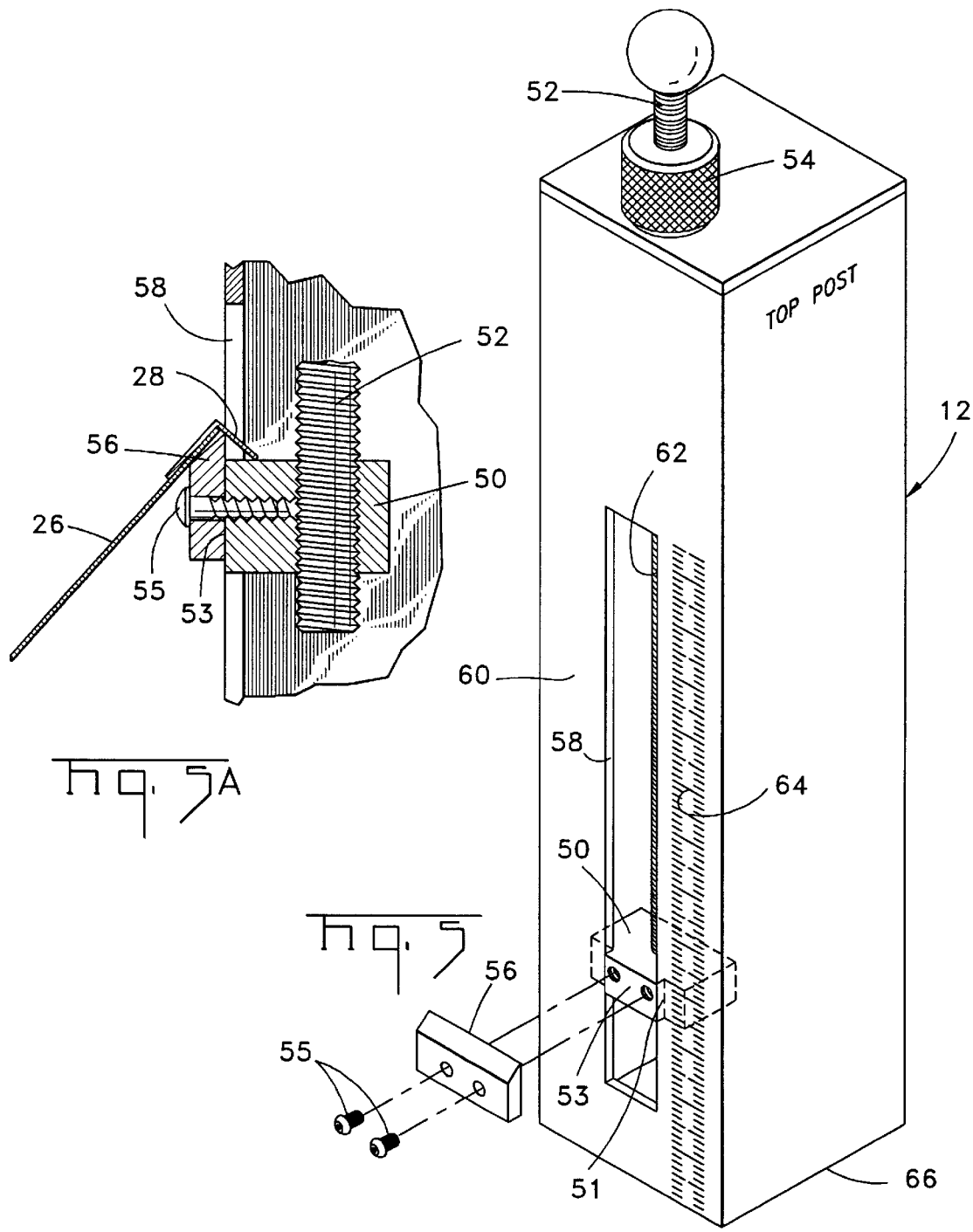

CONSTRUCTION AID FOR DETERMINING LENGTH AND ANGLE OF STAIR RAILINGS

FIELD OF THE INVENTION

The present invention is directed to a construction aid in determining the angle and length of stair railings to be set between a pair of spaced-apart, parallel, axially displaced rail posts, such as may be used in customizing the steps for outdoor porches, decks or patios.

BACKGROUND OF THE INVENTION

The invention hereof relates to a system, as embodied in a kit of parts and a method for using same, in precisely determining the angle and length of railing to be positioned between a pair of posts, one at the top and the other at the bottom of a series of steps. The system has particular utility in the design and construction of a railing for customized applications, such as porches, decks, and patios.

Fencing and railing for decks, for example, are no longer limited to traditional wood products, but for aesthetic and maintenance reasons, are now being made of plastic, such as polyvinyl chloride (PVC). PVC fencing may include various design features, but a common shape is a 4×4 inch, thick walled, hollow post with a uniquely designed cap. The posts, cross pieces, and spindles may be fabricated in advance for assembly on site. However, when it comes to constructing a railing for a series of steps, where the angle of elevation and the length of steps may be different for each job, it can sometimes be difficult to accurately determine the angle and length of the railing. Heretofore, this often resulted in costly mistakes and/or improperly fitting parts.

The prior art offered little help in providing background to this invention. While measuring instruments and tools are known and available as various construction aids, none appear to solve the problems encountered by the inventors hereof Exemplary measuring tools disclosed by the prior art are found in the following:

a) U.S. Pat. No. 5,414,942, to Moore, et al., is directed to a hand held device for measuring baluster lengths and replicating layout from a base surface to a handrail, for example. The measuring tool includes an elongate shaft which is selectively extendable to span a range of distances. A measuring scale is formed on the shaft for indicating the length spanned by the shaft, and a cockable/releasable pointed tip is disposed on an extremity of the tool for making indentation markings on a surface to be marked. A screw and corresponding measuring scale for specifying a depth off-penetration of the baluster into a handrail or stair tread for inclusion in the length indicated are also disclosed.

b.) U.S. Pat. No. 3,568,322, to Showers, teaches a measuring tool having a case containing a flexible measuring tape, a plumb bob cord reel with cord and plumb bob attached, en angle scale, and adjacent distance scale arranged concentrically on an arc with pivoted pointer swingable thereover. The pointer has a clamp for securing it in an adjusted position. A scriber arm is attached perpendicularly to the pointer and is swingable outwardly relative to a side edge to be scribed. The center pivot is biased to a normally retracted position, but can be manually extended and rotated to lock it in an extended position. The device is a construction aid to assist in measuring, marking, angle-measuring, arc scribing and level checking.

As noted previously, the prior art fails to provide any assistance to the skilled artesian wanting to solve the problem of determining the length and angle of stair railings. The unique manner by which the solution was found will become apparent to those skilled in the art from the following specification, particularly when read in conjunction with the accompanying drawings.

SUMMARY OF THE INVENTION

The invention relates to a construction aid kit, and to the method of using same, for precisely determining the length and angle of railing for installing such railing between a pair of parallel, spaced-apart, axially displaced posts, such as positioned at the top and bottom of a series of steps. The system hereof is particularly suited for customized, outdoor railing applications for porches, decks, and patios. The kit comprises first and second housing members configured to simulate at least the lower portion of the posts, where each housing member includes a vertically adjustable base, adjustable from a supporting surface, such as at ground level and the porch surface.

The first or lower housing member includes a pivotally mounted tape measure housing containing a measuring tape extendable to the second or upper housing member, where the tape measure housing is movable with the base. The tape measure housing further mounts an angle scale to identify the angular orientation of the extendable measuring tape.

After positioning the first and second housing members, where a "bubble" level may be fixed to the lower housing to ensure its proper vertical orientation, and vertically adjusting the respective housing members relative to the series of steps, the measuring tape is extended from the first housing to the second housing. A reading of the tape will instantly reveal the length of the railing to be secured between the posts. Additionally, with the measuring tape in the extended position, one can easily read the angle scale and determine immediately the angles for the respective ends of the railing. With this information, the user thereof can accurately cut the railing to size for setting between the respective railing posts.

Accordingly, an object of this invention is to provide a user thereof with a convenient system for precisely determining the length and angle of a railing(s) to be installed between a pair of railing posts.

Another object hereof is the establishment of a method for providing a means to accurately measure the railing requirements for a customized step arrangement.

A further object of this invention is the provision of a system for measuring railing segments for steps that will eliminate costly mistakes.

These and other objects will become apparent to those skilled in the art from the following description, particularly when read in conjunction with the accompanying drawings.

BRIEF DESCRIPTION OF DRAWINGS

FIG. 5 is a side, perspective view of the "mating" face for the second housing member of this invention, with hidden parts shown in phantom, showing a measuring tape guide mounted for movement with the vertically adjustable base.

FIG. 5A is an enlarged, partial sectional view showing the relationship of the extendable measuring tape to the tape guide in the operative mode.

DETAILED DESCRIPTION OF PREFERRED EMBODIMENTS

Figure 1:
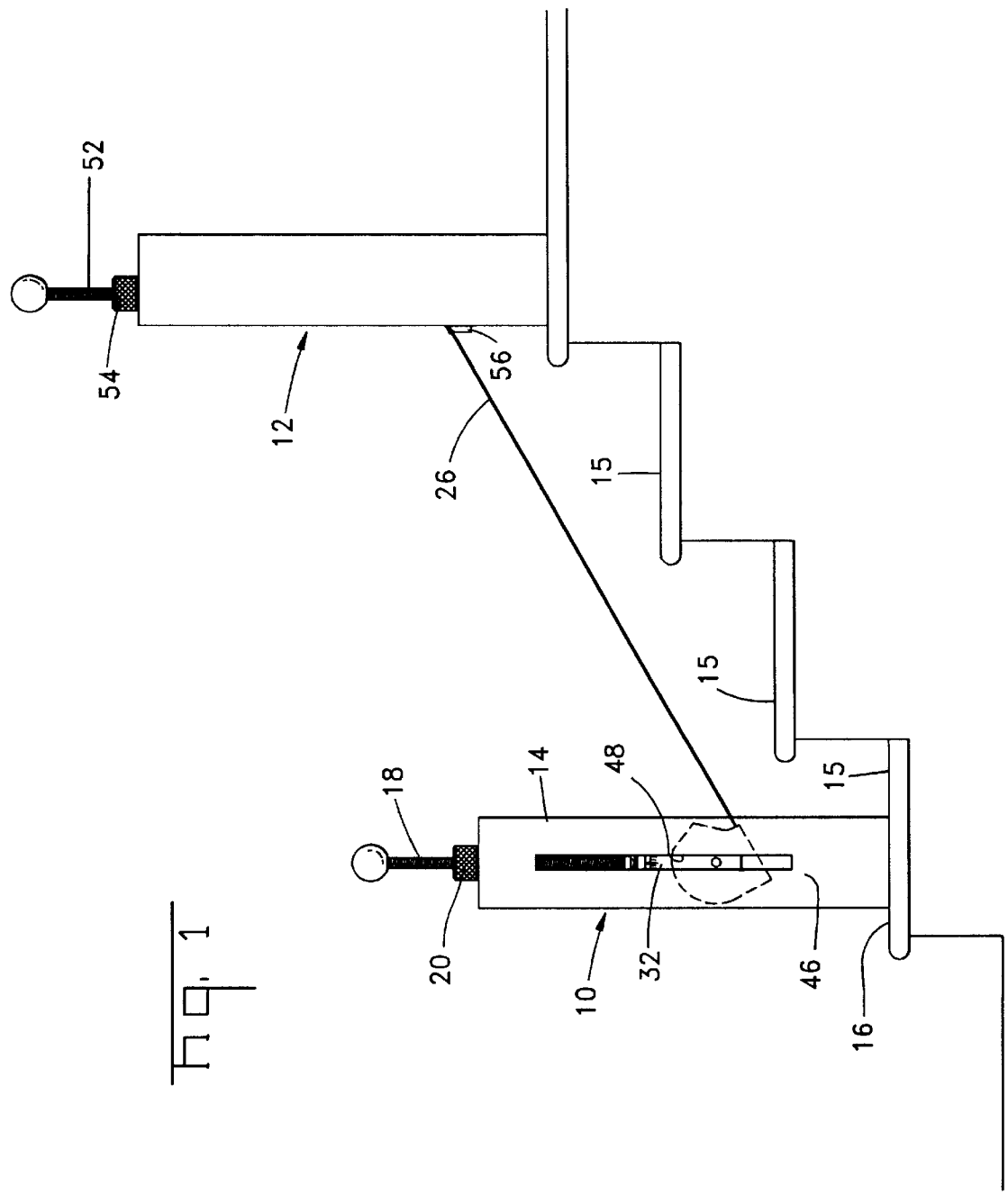
FIG. 1 is a side view illustrate the application of the system of this invention, showing the positioning of a pair of the housing members forming the kit of the invention.

The system of this invention will now be described with reference to the several Figures, where like reference numerals represent like components or features throughout the various views.

Figure 2:
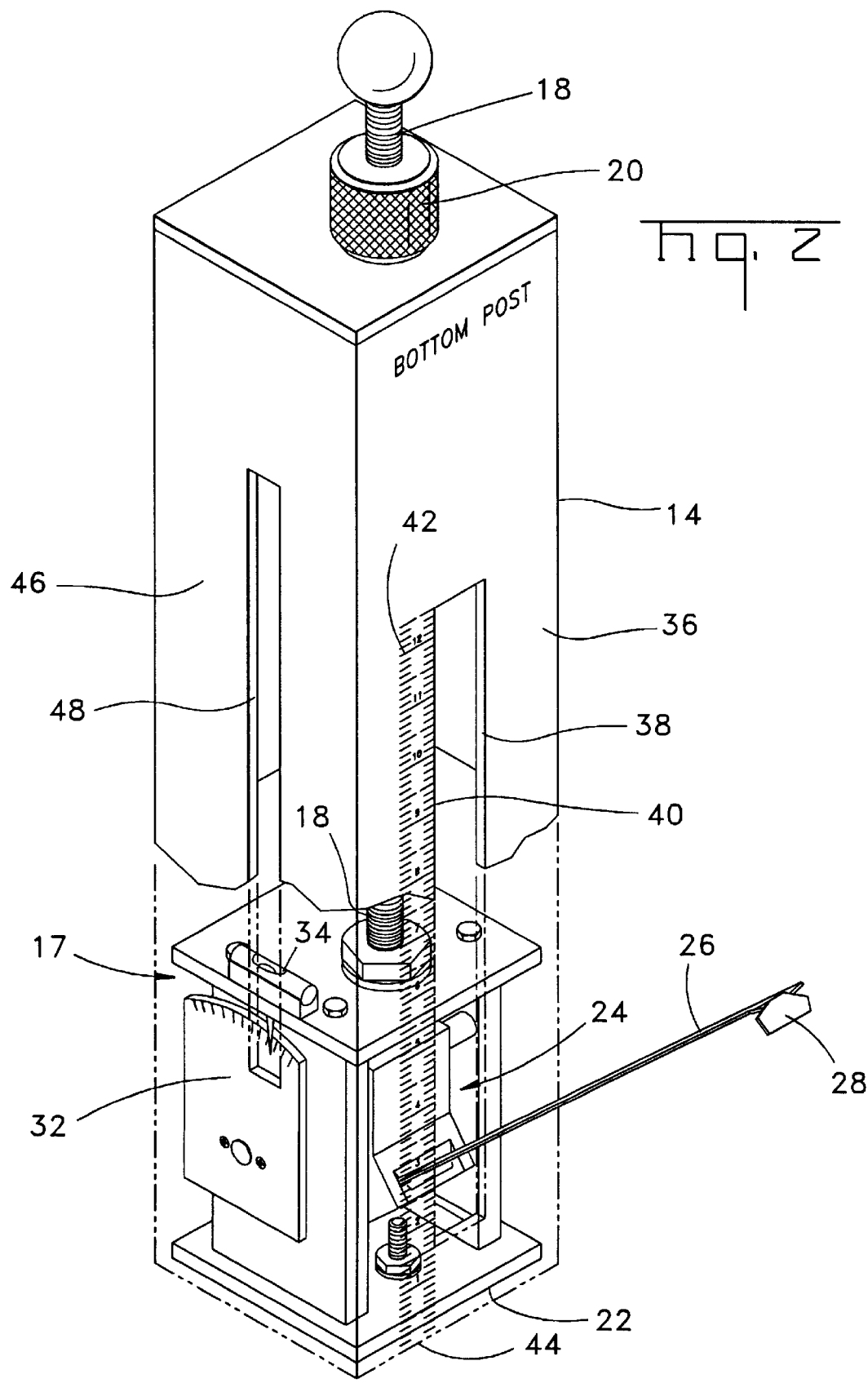
FIG. 2 is a side, perspective view showing the "mating" face for a first housing member of this invention, with parts removed to reveal certain inner details thereof.
Figure 3:
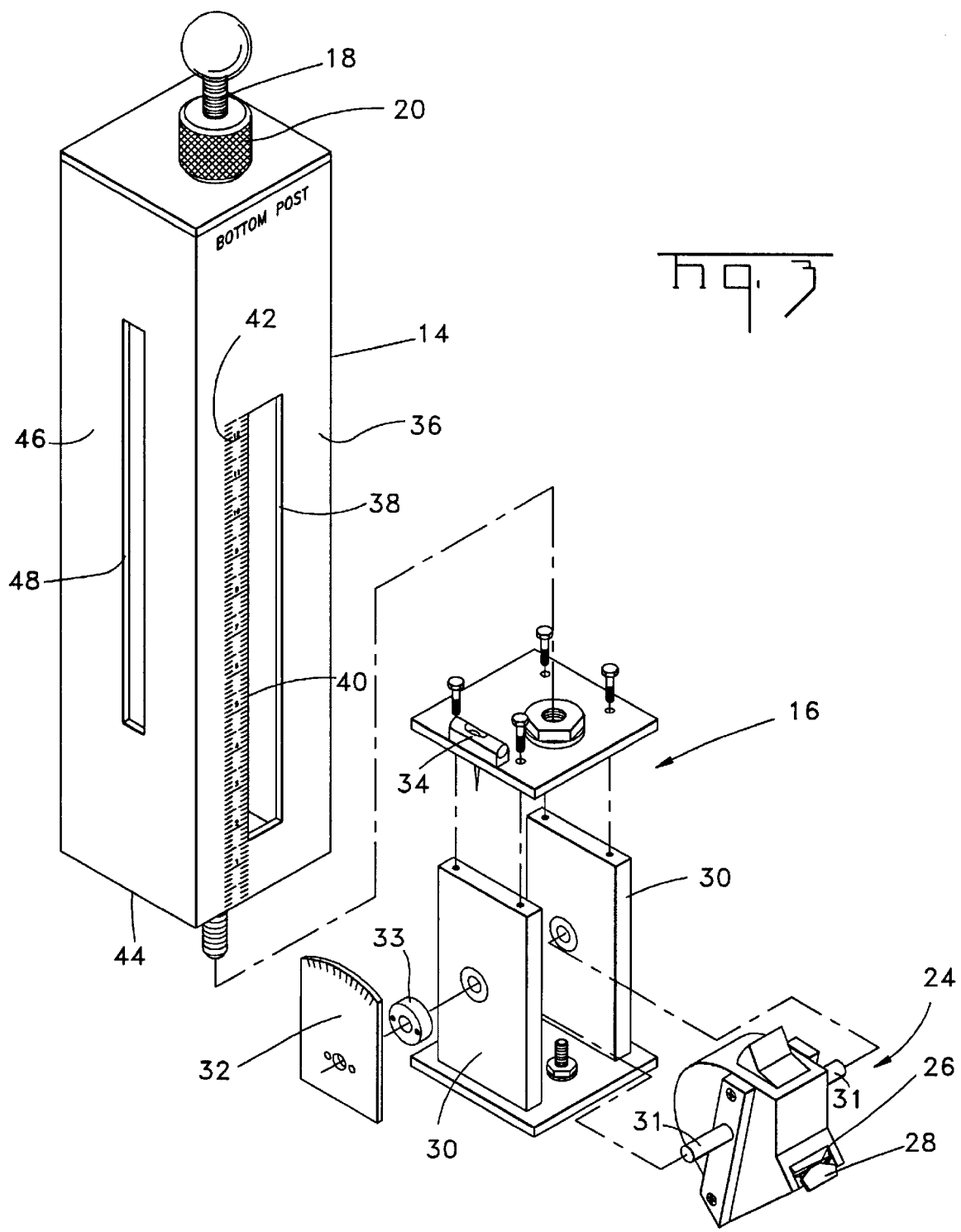
FIG. 3 is an exploded side, perspective view of the pivotal tape measure or first housing member, containing an extendable measuring tape, where the tape measure housing is shown as pivotally mounted to the vertically adjustable base of the first housing member.

FIG. 1 illustrates the system hereof as it may be used in determining the length and angle of a railing to be positioned between a pair of fixed posts. The system, in the form of a kit of parts to practice this invention, includes a pair of simulated post housing members 10, 12, where a first said housing member 10 comprises an elongated housing body 14 for positioning at the lower end of the series of steps 16, see FIGS. 2 through 4 for more details.

The elongated housing body 14 is generally square in cross section to simulate at least the base of a typical 4×4 inch fixed post. Mounted within the housing body 14 is a vertically adjustable base 17, configured to slidably move therewithin. The base 17 is fixedly secured to the end of a movable rod 18, such as by welding or threaded nut, where the rod 18, and hence the base 17, may be temporarily and spatially fixed by adjustment knob 20, relative to the bottom 22. The significance thereof will become clearer hereafter.

Figure 4:
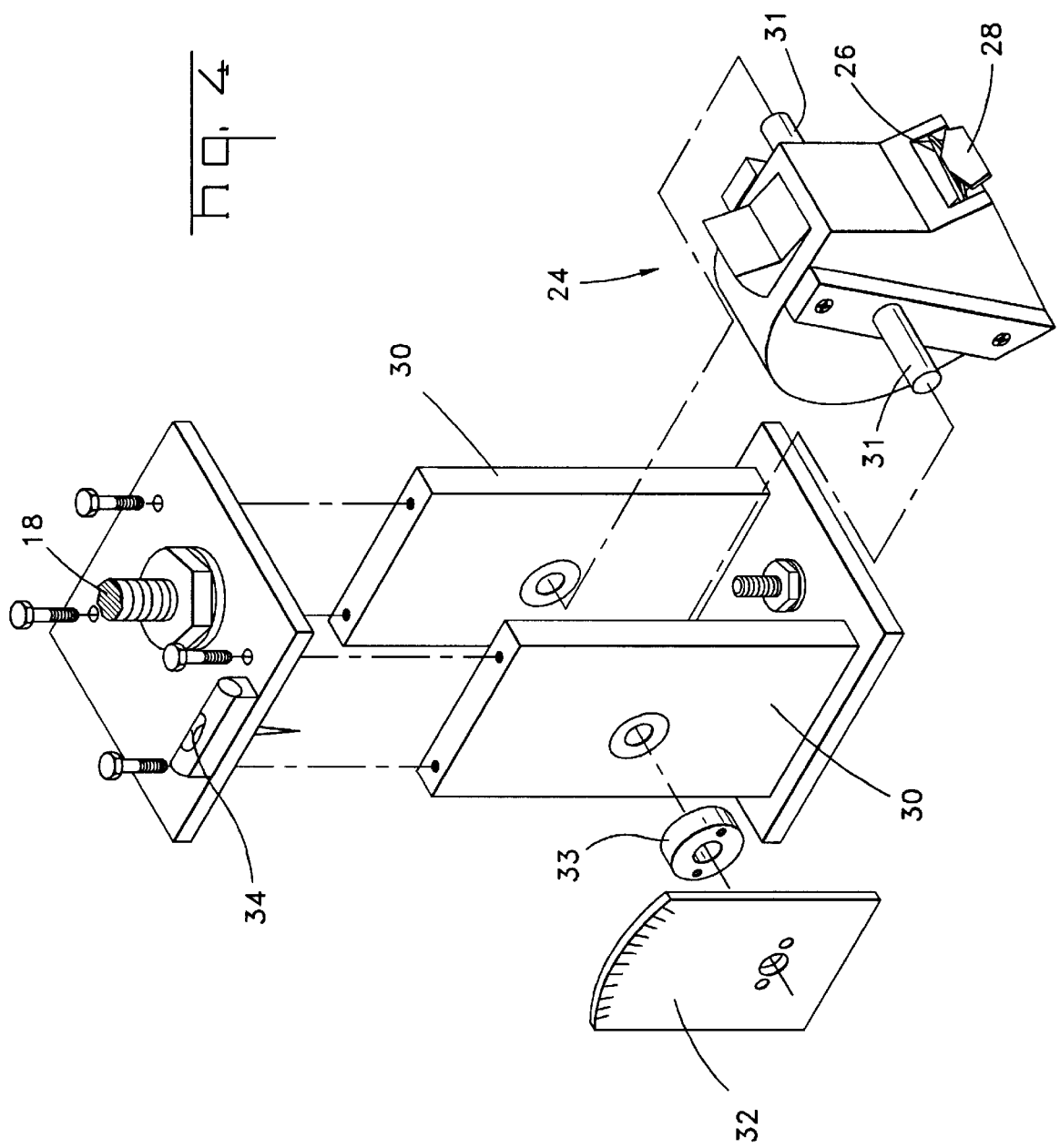
FIG. 4 is an enlarged, exploded, side perspective view of the first housing member showing the relationship of the components within the first housing member, and further showing an angle scale and "bubble" level.

Extending from the base 17, and movable therewith, is a pivotally mounted tape measure housing 24 containing an extendable tape measure 26 having an end flange 28, where the extendable tape measure is conventional, as known in the art. The preferred mounting means comprises a pair of parallel, spaced-apart, downwardly extending walls 30 to receive the tape measure housing 24 for pivotal movement therebetween by laterally extending arms 31 and fastening means 33. Mounted on the tape measure housing 24 is an angle scale 32 to identify the relative orientation of the tape measure housing to the housing body 14, where the angle scale is fixed to move or pivot with the tape measure housing 24. Further, to ensure the accuracy of the angle orientation relative to the horizontal, a "bubble" level 34, as known in the art, may be mounted to the base 17, as best seen in FIG. 4.

Since the measuring and leveling components are mounted within the housing body 14, access means in the form of slots are provided in the faces of the housing body 14. Specifically, in the simulated mating face 36, an elongated slot 38 is provided for the extendable measuring tape 26, where the face 36, adjacent the slot edges 40, includes a measuring scale 42, such as calculated in "inches", as measured from the bottom 44. In this manner, the user thereof can determine and then adjust the base 17 to a preselected height, as desired. On a second face 46, a second vertical slot 48 may be provided to allow reading of the angle scale 32 and "bubble" level 34.

The second simulated post housing member 12, is similarly configured to the elongated housing body 14. The post housing member 12 includes a movable base 50 secured, such as by welding or bolting, to a vertical rod 52 which has been provided with a height adjustment knob 54 to temporarily fix the height of the extended rod, and hence the base 50. The base 50 comprises a T-configured body with the leg 51 sized to slidably move along the vertical slot 58. Secured to the face 53, such as by fasteners 55, is an upwardly projecting tapered extension 56 which extends outwardly therefrom. The width of the extension 56 is slightly greater than the width of the slot 58 so as to ride along the simulated mating face 60. The tapered extension 56 is designed to removably receive and secure the end flange 28 of the measuring tape 26 in the extended position, see FIG. 5A. Like the companion post housing member 12, the edges 62 of slot 58 include a comparable scale 64, such as in "inches", which is a measure of the height of the base 50 above the bottom 66.

While a preferred embodiment has been described above, it is recognized that variations may be had with respect to the components of this invention. Therefore, while the invention has been disclosed in a preferred form only, it will be obvious to those skilled in the art that many additions, deletions and modifications can be made therein without departing from the spirit and scope of this invention, and that no undue limits should be imposed thereon except as set forth in the following claims.

What is claimed is:

1. A construction aid kit for determining the length and angle of railing to be set between a pair of spaced-apart, parallel, axially displaced posts, where said posts have rail mounting faces opposed to one another, said kit comprising:

first and second housing members configured to simulate at least the lower portion of said posts, each said housing member including a vertically adjustable base, adjustable from a supporting surface, said first housing member including a pivotally mounted tape measure housing containing a measuring tape extendable to said second housing, said tape measure housing movable with said base and mounting an angle scale to identify the angular orientation of said extendable measuring tape, whereby the user thereof can determine precisely the angular distance between said rail mounting faces and the angle of said railing, wherein said first housing member further includes a second wall having an opening for viewing said angle scale.

2. The construction aid kit according to claim 1, wherein said housing members each include a face to simulate said rail mounting faces, with said simulated mounting faces including vertical slots communicating with the interior of its respective said housing member, and a fixed measuring scale associated with said slot, whereby to precisely position said adjustable bases from respective said supporting surfaces.

3. The construction aid kit according to claim 2, wherein said second housing member includes a guide member fixed to said second housing base and arranged to slide within said second housing slot, whereby the free end of said extendable measuring tape may be temporarily secured to said guide member to fix the angular distance between said first and second housing members.

4. The construction aid kit according to claim 1, wherein said tape measure housing is mounted for pivotal movement relative to said first housing base.

5. The construction aid kit according to claim 4, wherein bubble level is mounted on said first housing base and visible through said second wall opening to ensure a perpendicular orientation for said first housing member to said supporting surface.

6. The construction aid kit according to claim 1, wherein said first and second housing members each include a vertical threaded rod extending into said housing members for manually adjusting said bases.

* * * * *